United States Patent
Mantha et al.

(10) Patent No.: US 11,107,144 B2
(45) Date of Patent: Aug. 31, 2021

(54) AUTOMATICALLY DETERMINING IN REAL-TIME A TRIGGERING MODEL FOR PERSONALIZED RECOMMENDATIONS

(71) Applicant: Walmart Apollo, LLC, Bentonville, AR (US)

(72) Inventors: Aditya Mantha, Sunnyvale, CA (US); Rahul Radhakrishnan Iyer, Santa Clara, CA (US); Shashank Kedia, Sunnyvale, CA (US); Shubham Gupta, Sunnyvale, CA (US); Praveenkumar Kanumala, Newark, CA (US); Stephen Dean Guo, Saratoga, CA (US); Kannan Achan, Saratoga, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 16/779,541

(22) Filed: Jan. 31, 2020

(65) Prior Publication Data
US 2021/0241349 A1 Aug. 5, 2021

(51) Int. Cl.
*G06Q 30/06* (2012.01)
*G06N 7/00* (2006.01)

(52) U.S. Cl.
CPC ......... *G06Q 30/0631* (2013.01); *G06N 7/005* (2013.01); *G06Q 30/0633* (2013.01)

(58) Field of Classification Search
CPC . G06Q 30/0631; G06Q 30/0633; G06N 7/005
(Continued)

(56) References Cited

U.S. PATENT DOCUMENTS 7,376,586 B1  5/2008  Partovi et al.
8,429,026 B1  4/2013  Kolawa et al.
(Continued)

OTHER PUBLICATIONS

Liang, et al., "Factorization Meets the Item Embedding: Regularizing Matrix Factorization with Item Co-Occurrence," RecSys '16: Proceedings of the 10th ACM Conference on Recommender Systems, Sep. 2016, pp. 59-66, <URL: https://dx.doi.org/10.1145/2959100.2959182>. Retrieved from the Internet: <URL: http://www.cs.toronto.edu/~lcharlin/papers/cafactorization.pdf> [retrieved on Apr. 20, 2020].

(Continued)

*Primary Examiner* — Alexis M Casey
(74) *Attorney, Agent, or Firm* — Bryan Cave Leighton Paisner LLP

(57) ABSTRACT

A method including building a recommendation triggering model. The method can include receiving, via a user device of a user through a network, an add-to-cart command associated with an anchor item in a session by the user. The method further can include determining, in real-time after receiving the add-to-cart command, a recommendation for one or more complementary items based at least in part on: (a) the anchor item; and (b) a user profile of the user. The method also can include determining, in real-time after determining the recommendation, a recommendation confidence for the recommendation based at least in part on one or more of: (a) the user profile; (b) the anchor item; (c) the one or more complementary items; or (d) one or more feedbacks from the user associated with one or more prior recommendations in the session. The method additionally can include after determining the recommendation confidence, when the recommendation confidence is positive, transmitting, in real-time through the network, the one or more complementary items to be presented to the user via the user device. The method likewise can include after (Continued)

determining the recommendation confidence, when the recommendation confidence is not positive, refraining from transmitting the one or more complementary items to the user. Other embodiments are disclosed.

20 Claims, 9 Drawing Sheets

(58) Field of Classification Search
USPC ............................................................ 705/26.7
See application file for complete search history.

(56) References Cited

U.S. PATENT DOCUMENTS

| | | | |
|---|---|---|---|
| 2003/0105682 | A1 | 6/2003 | Dicker et al. |
| 2003/0171944 | A1* | 9/2003 | Fine .................... G16H 20/60 705/2 |
| 2004/0059626 | A1 | 3/2004 | Smallwood |
| 2004/0230440 | A1 | 11/2004 | Malhotra |
| 2009/0281923 | A1 | 11/2009 | Selinger et al. |
| 2009/0281973 | A1* | 11/2009 | Selinger ................ G06Q 30/02 706/14 |
| 2011/0282821 | A1 | 11/2011 | Levy et al. |
| 2014/0172624 | A1 | 6/2014 | Stoppelman |
| 2015/0112826 | A1 | 4/2015 | Crutchfield, Jr. |
| 2015/0339754 | A1 | 11/2015 | Bloem et al. |
| 2016/0117407 | A1 | 4/2016 | Cypher et al. |
| 2017/0300996 | A1 | 10/2017 | Abuelsaad et al. |
| 2017/0300999 | A1 | 10/2017 | Wilkinson et al. |
| 2017/0372400 | A9 | 12/2017 | Levy et al. |
| 2019/0108538 | A1 | 4/2019 | Montero et al. |
| 2019/0236680 | A1 | 8/2019 | Kounine et al. |
| 2019/0362409 | A1* | 11/2019 | Srinivasan ......... G06Q 30/0631 |

OTHER PUBLICATIONS

Ruiz, et al., "Shopper: A Probabilistic Model of Consumer Choice with Substitutes and Complements," arXiv:1711.03560v3 [stat. ML], Jun. 9, 2019. Retrieved from the Internet: <URL: https://arxiv.org/pdf/1711.03560.pdf> [retrieved on Apr. 20, 2020].

Wan, et al., "Representing and Recommending Shopping Baskets with Complementarity, Compatibility, and Loyalty," CIKM '18: Proceedings of the 27the ACM International Conference on Information and Knowledge Management, Oct. 2018, pp. 1133-1142, <URL: https://doi.org/10.1145/3269206.3271786>. Retrieved from the Internet: <URL: https://www.microsoft.com/en-us/research/uploads/prod/2019/01/cikm18_mwan.pdf> [retrieved on Apr. 20, 2020].

Grbovic, et al., "E-commerce in Your Inbox: Product Recommendations at Scale," KDD '15: Proceedings of the 21th ACM SIGKDD International Conference on Knowledge Discovery and Data Mining, Aug. 2015, pp. 1809-1818, <URL: http://dx.doi.org/10.1145/2783258.2788627>. Retrieved from the Internet: <URL: https://arxiv.org/pdf/1606.07154.pdf> [retrieved on Apr. 20, 2020].

Barkan, et al., "Item2Vec: Neural Item Embedding for Collaborative Filtering," Oct. 2015, <URL: https://arxiv.org/ftp/arxiv/papers/1603/1603.04259.pdf > [retrieved on Apr. 20, 2020].

Hu, et al., "Collaborative Filtering for Implicit Feedback Datasets," ICDM '08: Proceedings of the 2008 Eighth IEEE International Conference on Data Mining, Dec. 2008, pp. 263-272, <URL: https://doi.org/10.1109/ICDM.2008.22>. Retrieved from the Internet: <URL: http://yifanhu.net/PUB/cf.pdf> [retrieved on Apr. 20, 2020].

Sun, et al. "Conversational Recommender System," SIGIR '18: The 41st International ACM SIGIR Conference on Research & Development in Information Retrieval, arXiv:1806.03277v1 [cs.IR], Jun. 2018, pp. 235-244, <URL: https://doi.org/10.1145/3209978.3210002>. Retrieved from the Internet: <<URL: https://arxiv.org/pdf/1806.03277.pdf> [retrieved on Apr. 20, 2020].

Dong, et al., "metapath2vec: Scalable Representation Learning for Heterogeneous Networks," KDD '17: Proceedings of the 23rd ACM SIGKDD International Conference on Knowledge Discovery and Data Mining, Aug. 2017, pp. 135-144, <URL: https://doi.org/10.1145/3097983.3098036>. Retrieved from the Internet: <URL: https://ericdongyx.github.io/papers/KDD17-dong-chawla-swami-metapath2vec.pdf> [retrieved on Apr. 20, 2020].

* cited by examiner

500

510 Receive an add-to-cart command associated with an anchor item in a session by a user.

520 Determine a recommendation for complementary item(s).

521 Determine the complementary item(s).

522 Determine a respective rank for each of the complementary item(s).

523 Re-rank the complementary item(s) based on a respective likelihood score for each of the complementary item(s) based on a preference of the user.

530 When an item of the complementary items is either the user's favorite or in promotion, re-ranking the complementary items by boosting the item.

540 Determine a recommendation confidence for the recommendation.

550 Transmit the complementary items to be presented via the user device only when the recommendation confidence is positive.

710 Determine the joint probability distribution(s) for the complementary item(s) based at least in part on the user profile, the content of the cart, and/or user feedbacks in the current session.

720 Determine approximate entropy of the joint probability distribution(s) for the complementary item(s).

730 Determine a recommendation confidence for the recommendation based on whether the approximate entropy is less than the predetermined uncertainty threshold.

FIG. 7

AUTOMATICALLY DETERMINING IN REAL-TIME A TRIGGERING MODEL FOR PERSONALIZED RECOMMENDATIONS

TECHNICAL FIELD

This disclosure relates generally to automatically determining in real-time a triggering model for personalized recommendations.

BACKGROUND

Online ordering systems generally provide recommendations for complementary items based on the items users add to their electronic carts and/or the items the users previously purchased. However, excessive recommendations that do not sufficiently reflect the users' preferences are often declined and can waste the precious network bandwidth, when the users order online using their mobile data, or the users' time if the users are slowed down because of the recommendations. Therefore, systems and/or methods that can determine in real-time a triggering model and refrain from cross selling when lacking sufficient recommendation confidence are desired.

BRIEF DESCRIPTION OF THE DRAWINGS

To facilitate further description of the embodiments, the following drawings are provided in which:

FIG. 5 illustrates a flow chart for a method for determining a recommendation confidence before providing personalized recommendations, according to an embodiment;

FIG. 7 illustrates a flow chart for a block of determining a recommendation confidence for the recommendation, according to the embodiment of FIG. 5;

Figure 1:
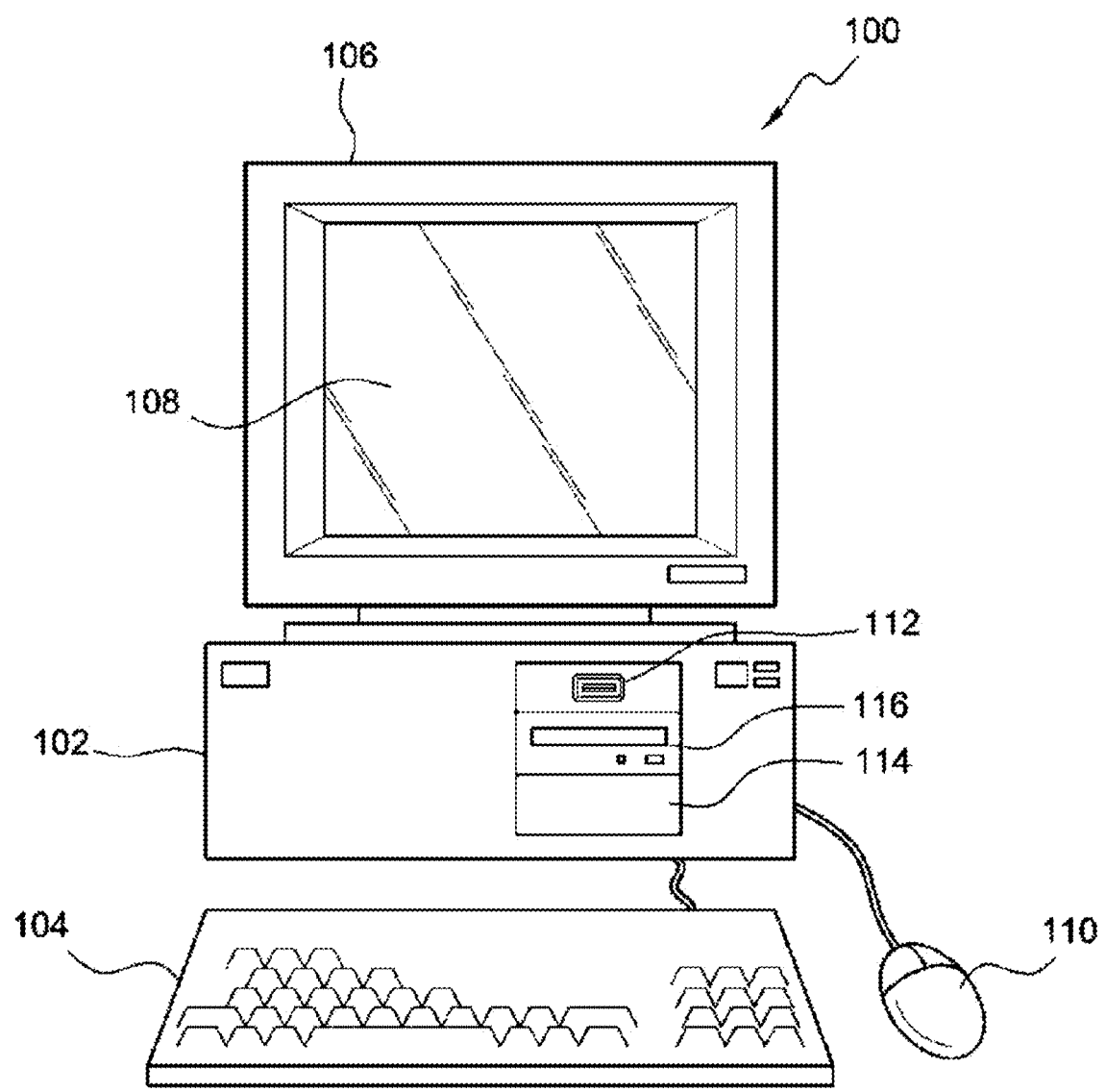
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, or a minute.

DESCRIPTION OF EXAMPLES OF EMBODIMENTS

Figure 2:
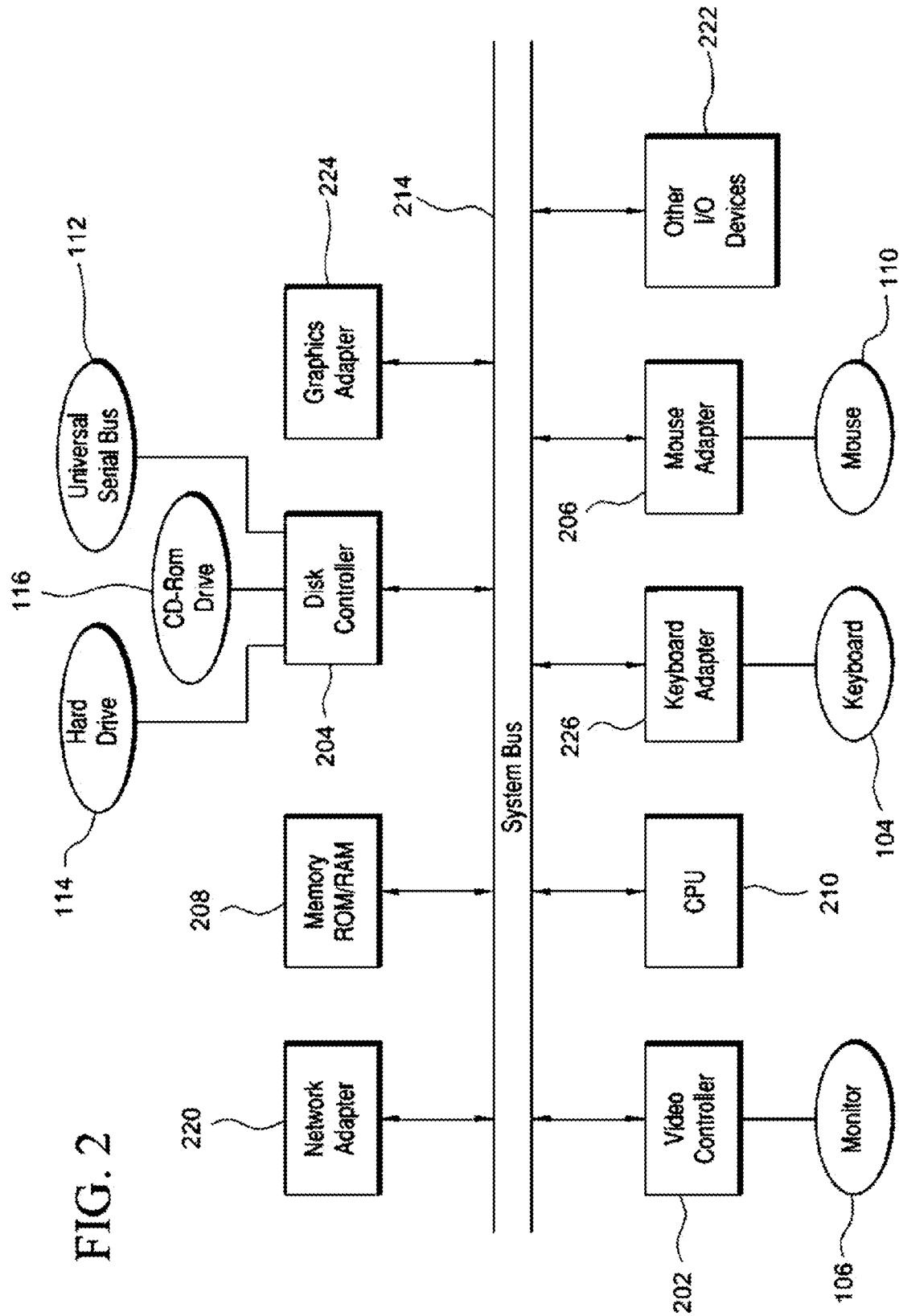
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
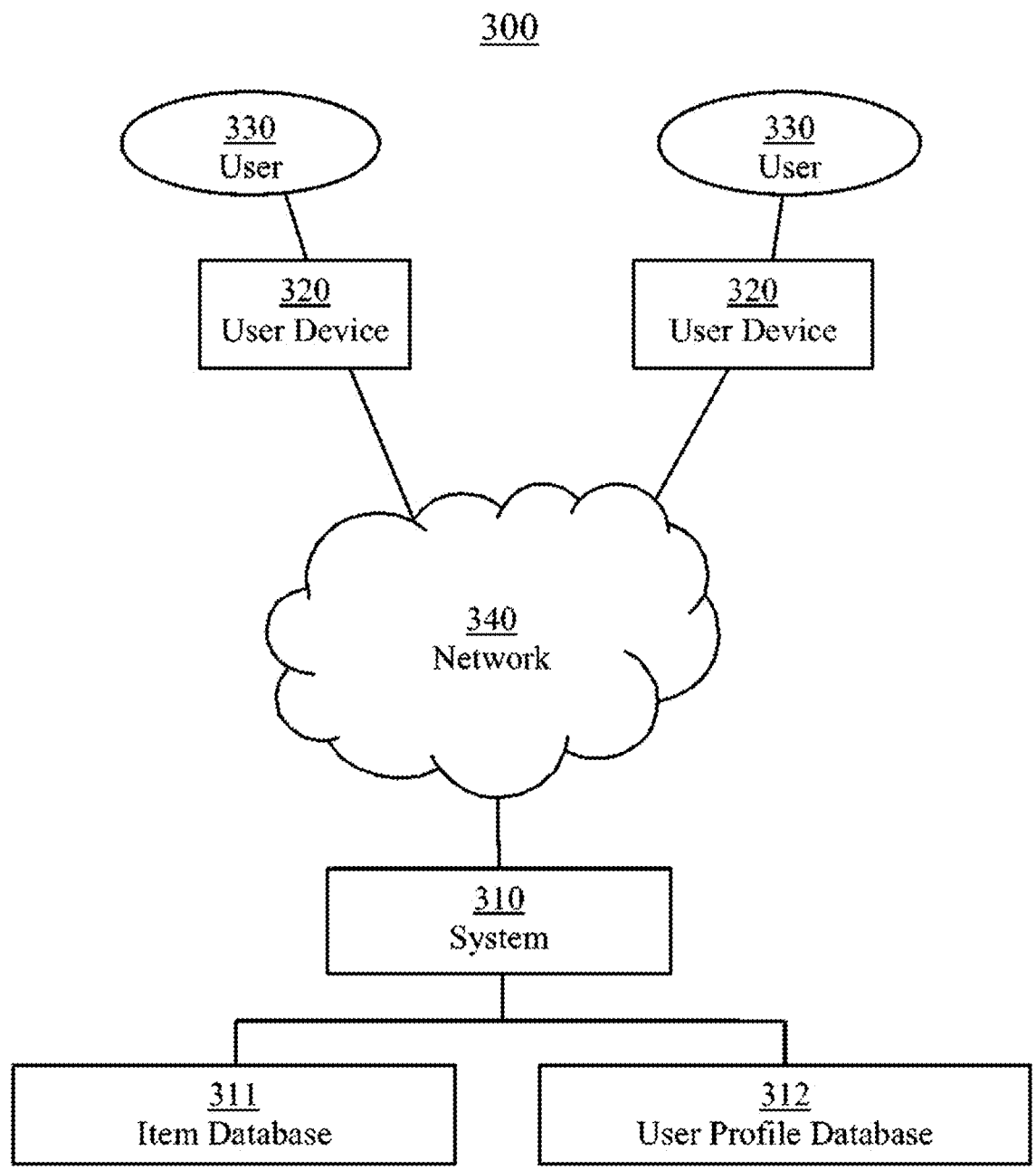
FIG. 3 illustrates a block diagram of a system that can be employed for determining a recommendation confidence before providing personalized recommendations, according to an embodiment.

Turning ahead in the drawings, FIG. 3 illustrates a block diagram of a system 300 that can be employed for determining a recommendation confidence (e.g., a trigger for recommendation) before providing personalized recommendations, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include one or more systems (e.g., system 310) and one or more user devices (e.g., user devices 320). System 310 and user devices 320 can each be a computer system, such as computer system 100 (FIG. 1), as described above, and can each be a single computer, a single server, or a cluster or collection of computers or servers, or a cloud of computers or servers. In another embodiment, a single computer system can host each of system 310 and/or user devices 320. In many embodiments, system 310 can be modules of computing instructions (e.g., software modules) stored at non-transitory computer readable media that operate on one or more processors. In other embodiments, system 310 can be implemented in hardware. In many embodiments, system 310 can comprise one or more systems, subsystems, modules, or servers. Additional details regarding system 310 and/or user devices 320 are described herein.

In some embodiments, system 310 can be in data communication, through a computer network, a telephone network, or the Internet (e.g., network 340), with user devices 320. In some embodiments, user devices 320 can be used by users, such as users 330. In a number of embodiments, system 310 can comprise a front end subsystem that hosts one or more websites and/or mobile application servers. For example, the front end subsystem of system 310 can host a website, or provide a server that interfaces with an application (e.g., a mobile application or a web browser), on user devices 320, which can allow users 330 to browse and/or search for items (e.g., products), to add items to an electronic cart, and/or to purchase items, in addition to other suitable activities. In a number of embodiments, the front end subsystem of system 310 can host a voice-based e-commerce system (e.g., automated telephone ordering system), or provide a server that interfaces with an audio communication application, on user device 320, which can allow users 330 to search for items (e.g., products), to add items to an electronic cart, and/or to purchase items via speech, in addition to other suitable activities.

In some embodiments, an internal network (e.g., network 340) that is not open to the public can be used for communications between system 310 and user devices 320 within system 300. Accordingly, in some embodiments, system 310 (and/or the software used by such systems) further can comprise a back end subsystem operated by an operator and/or administrator of system 310. For example, the back end subsystem of system 310 can host an e-commerce transaction system, a customer relationship management system, and/or a data storage system, etc. In these or other embodiments, the operator and/or administrator of system 310 can manage system 310, the processor(s) of system 310, and/or the memory storage unit(s) of system 310 using the input device(s) and/or display device(s) of system 310.

In certain embodiments, the user devices (e.g., user devices 320) can be desktop computers, laptop computers, a mobile device, and/or other endpoint devices used by one or more users (e.g., users 330). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Wash., United States of America.

In many embodiments, system 310 can include one or more input devices (e.g., one or more keyboards, one or more keypads, one or more pointing devices such as a computer mouse or computer mice, one or more touchscreen displays, a microphone, etc.), and/or can comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to system 310 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of system 310. In a similar manner, the processors and/or the non-transitory computer-readable media can be local and/or remote to each other.

Meanwhile, in many embodiments, system 310 also can be configured to communicate with one or more databases (e.g., an item database 311 and/or a user profile database 312). The one or more databases can include a product database that contains information about products, items, or SKUs (stock keeping units), for example, including attribute names and attribute values, among other information, as described below in further detail. The one or more databases further can include a user profile database that contains user profiles of users 330, including information such as account data, payment methods, transaction histories, browsing histories, user preferences for items or attributes of items, and so forth, as described below in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases (e.g., item database 311 and/or user profile database 312) can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, system 300, system 310, and/or the one or more databases (e.g., item database 311 and/or user profile database 312) can be implemented using any suitable manner of wired and/or wireless communication. Accordingly, system 300 and/or system 310 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, system 310 can receive, from user device 320 through network 340, an add-to-cart command associated with an anchor item in a session by user 330; determine, in real-time, whether user 330 is likely to accept a recommendation for one or more complementary items; and upon deciding that user 330 is likely to accept the recommendation, transmit the one or more complementary items to be presented to user 330 via user device 320. In some embodiments, system 310 can determine the one or more complementary items, based at least in part on: (a) the anchor item, and (b) a user profile of user 330. In certain embodiments, system 310 can gauge whether user 330 is likely to accept the recommendation based on a recommendation confidence for the recommendation determined based at least in part on one or more of: the user profile, the anchor item, the one or more complementary items, or one or more feedbacks from user 330 associated with one or more prior recommendations in the session, etc.

For online shopping platforms that host a large number of items, such as over 50 thousand, 90 thousand, or 200 million unique items, the number of potential complementary items to be considered for real-time recommendation can be massive. In addition, in order to provide effective recommendations to users, the recommendations can be personalized and presented in a timely manner, generally in seconds. Further, under certain circumstances, such as shopping via a voice-based ordering platform, any interactions initiated by the platform, e.g., cross-sale offers, can be provided with extra care because they can annoy users or even cause early termination and/or loss of sale, if the recommendations are not made with sufficient confidence. In many embodiments, system 300 and/or system 310 can provide a technology-based solution to automatically determine a recommendation for one or more complementary items from a large number of items, and then to automatically gauge a recommendation confidence, both completed in real-time after receiving the add-to-cart command for the anchor item. In some embodiments, system 300 and/or system 310 can determine the recommendation confidence based at least in part on one or more of: the user profile, the anchor item, the one or more complementary items, or one or more feedbacks from user 330 associated with one or more prior recommendations in the session. In some embodiments, system 300 and/or system 310 can transmit, through network 340, the one or more complementary items to be presented to user 330 via user device 320, when the recommendation confidence is positive, and refrain from doing so, when the recommendation confidence is not positive. When system 300 or 310 determines that the recommendation is to be provided to the user, system 300 or 310 can transmit, through network 340, the one or more complementary items to be presented to user 330 via user device 320, at a suitable timing, such as in real-time, before checking out, or before a session change.

Conventional systems are unable to automatically determine whether to provide a personalized recommendation, other than to always recommend complementary items, because conventional systems typically lack the ability to gauge the recommendation confidence for the personalized recommendation. In many embodiments, recommendation confidence determining techniques provided by system 300 and/or system 310 can advantageously address the problem by calculating a numerical score for gauging the recommendation confidence, and can use the recommendation confidence as guidance as to whether recommendation should be presented to users 330.

Figure 4:
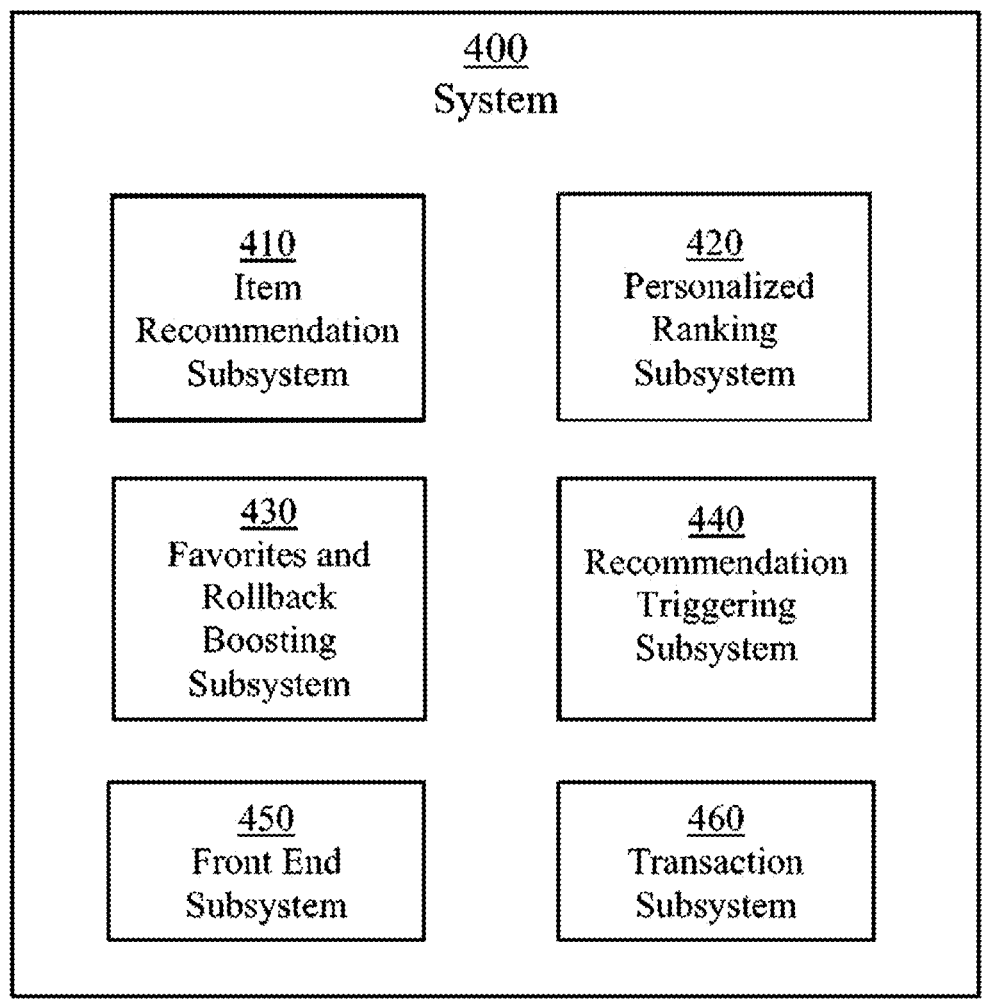
FIG. 4 illustrates a block diagram of a system that can be employed for determining a recommendation confidence (e.g., a trigger for recommendation) before providing personalized recommendations, according to another embodiment.

Turning ahead in the drawings, FIG. 4 illustrates a block diagram of a system 400 that can be employed for determining a recommendation confidence before providing personalized recommendations, according to another embodiment. System 400 is merely exemplary and embodiments of the system are not limited to the embodiments presented herein. The system can be employed in many different embodiments or examples not specifically depicted or described herein. In some embodiments, certain elements, modules, or systems of system 400 can perform various procedures, processes, and/or activities. In other embodiments, the procedures, processes, and/or activities can be performed by other suitable elements, modules, or systems of system 400. In many embodiments, system 400 can be similar or identical to system 300 (FIG. 3) and/or system 310 (FIG. 3). In many embodiments, system 400 can perform one or more acts performed by system 300 (FIG. 3) and/or system 310 (FIG. 3), as described herein.

Generally, system 400 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 400 described herein. In many embodiments, system 400 can be modules of computing instructions (e.g., software modules) stored at non-transitory computer readable media that operate on one or more processors. In other embodiments, system 400 can be implemented in hardware. In many embodiments, system 400 can comprise one or more systems, subsystems, modules, or servers. Additional details regarding system 400 are described herein.

In a number of embodiments, system 400 can comprise one or more subsystems, such as item recommendation subsystem 410, personalized ranking subsystem 420, favorites and rollback boosting subsystem 430, recommendation triggering subsystem 440, front end subsystem 450, and/or transaction subsystem 460, and each of the one or more subsystems can be implemented with hardware and/or software, as described herein.

In many embodiments, system 400 can be configured to: (a) receive, by front end subsystem 450 from a user device (e.g., 320 (FIG. 3)) through a network (e.g., 340 (FIG. 3)), an add-to-cart command associated with an anchor item in a session by the user (e.g., 330 (FIG. 3)); (b) determine, by recommendation triggering subsystem 440 in real-time, a recommendation confidence as to whether the user is likely to accept a recommendation for one or more complementary items, wherein the recommendation is determined by one or more of: item recommendation subsystem 410, personalized ranking subsystem 420, and/or favorites and rollback boosting subsystem 430; and (c) when the recommendation confidence is positive, transmit, by the front end subsystem 450, the one or more complementary items to be presented to the user via the user device. In some embodiments, system 400 also can be configured to process, by transaction subsystem 460, orders, payments, and/or delivery requests, received by front end subsystem 450 from the user via the user device through the network.

In certain embodiments, front end subsystem 450 can host a website or server to receive and recognize inputs in various forms, such as text, audio, or video, of commands from users. For example, front end subsystem 450 can host an automatic speech recognition system configured to recognize and translate into text, in real-time, a commands of the user and/or anchor items from input audio data, and/or the speech recognition system can include a machine learning module configured to gradually fine-tune speech recognition accuracy. In many embodiments, the automatic speech recognition system of front end subsystem 450 can be implemented with hardware and/or software using one or more of statistically-based speech recognition algorithms, including hidden Markov models (HMM), dynamic time warping, neural networks, recurrent neural networks, deep feedforward neural network (DNN), connectionist temporal classification (CTC)-based end-to-end automatic speech recognition, or attention-based end-to-end automatic speech recognition, etc.

Turning ahead in the drawings, FIG. 5 illustrates a flow chart for a method 500 of automatically determining a recommendation confidence, according to an embodiment. Method 500 is merely exemplary and is not limited to the embodiments presented herein. Method 500 can be employed in many different embodiments or examples not specifically depicted or described herein. In some embodiments, the procedures, the processes, and/or the activities of method 500 can be performed in the order presented. In other embodiments, the procedures, the processes, and/or the activities of method 500 can be performed in any suitable order. In still other embodiments, one or more of the procedures, the processes, and/or the activities of method 500 can be combined or skipped.

In many embodiments, system 300 (FIG. 3), system 310 (FIG. 3), and/or system 400 (FIG. 4) can be suitable to perform method 500 and/or one or more of the activities of method 500. In these or other embodiments, one or more of the activities of method 500 can be implemented as one or more computing instructions configured to run at one or more processors and configured to be stored at one or more non-transitory computer readable media. Such non-transitory computer readable media can be part of system 300 (FIG. 3), system 310 (FIG. 3), or system 400 (FIG. 4). The processor(s) can be similar or identical to the processor(s) described above with respect to computer system 100 (FIG. 1).

In some embodiments, method 500 and other blocks in method 500 can include using a distributed network including distributed memory architecture to perform the associated activity. This distributed architecture can reduce the impact on the network and system resources to reduce congestion in bottlenecks while still allowing data to be accessible from a central location.

Referring to FIG. 5, method 500 can include a block 510 of receiving an add-to-cart command associated with an anchor item in a session by a user. The add-to-cart command can be received from a user device (e.g., user device 320 (FIG. 3)) of the user (e.g., user 330 (FIG. 3)) via a network (e.g., network 340 (FIG. 3)). In some embodiments, method 500 further can comprise a block 520 of determining a recommendation for one or more complementary items. Block 520 further can comprise block 521 of determining the one or more complementary items for the anchor item. Various approaches can be adopted for determining the one or more complementary items. For example, block 521 can choose the one or more complementary items based at least in part on one or more of: (a) the popularity of each of the one or more complementary items; (b) whether and/or how often the anchor item and each of the one or more complementary items appear in the same transactions of all transactions by users; (c) whether and/or how often items with an item type for the anchor item and items with an item type for each of the one or more complementary items are bought together; (d) association rule mining; (e) pointwise mutual information; (f) factorization inspired approaches such as tensor factorization, or collective matrix factorization, etc.; and/or (g) skip-gram inspired approaches, such as Item2Vec, Prod2Vec, BB2Vec, or Metapath2Vec, etc. In some embodiments, block 521 can generate a respective score for each of the one or more complementary items, while determining the one or more complementary items.

In some embodiment, block 521 can use a revised skip-gram approach using triplets in the form of (user (u), anchor item (i), complementary item (j)), representing 2 items (i & j) purchased together by a user (u) of users in the same transaction or added to the cart by the user (u). In similar or other embodiments, block 521 can use word embeddings for users ($h_u$) and/or items ($p_i$ & $q_j$) to determine an item-item complementarity and/or a user-item compatibility. For example, an item-item complementarity between anchor item (i), complementary item (j) can be determined by a dot product of $p_i$ and $q_1$, and a user-item compatibility between user (u) and anchor item (i) can be determined by a dot product of $h_u$ and $p_i$. In certain embodiments, block 521 can determine a cost function ($L_1$) of the triplet (user (u), anchor item (i), complementary item (j)) based on one or more conditional probabilities, such as Bayesian probability, by:

$$L_1(u,i,j) = P(i|j,u) + P(j|i,u) + P(i|i,j)$$

where $$P(i|j, u) = \frac{\exp(s_{i,j,u})}{\sum_i \exp(s_{i,j,u})}; s_{i,j,u} = p_i^T q_j + p_i^T h_u + q_j^T h_u$$

and $p_i$, $q_j$ are dual item embeddings and $h_u$ is the user embedding

In a number of embodiments, block 521 also can determine the one or more complementary items based at least in part on the relationship between the respective item types for the anchor item and each of the one or more complementary items. Block 521 can use a co-bought likelihood or probability between item types (e.g., an item-type compatibility score). That is, the respective a respective item-type compatibility score for each of the one or more complementary items can be determined based at least in part on the likelihood that one of the items having the item type of the anchor item and one of the items with the item type of the each of the one or more complementary items are bought together by users in general, when each of all of the items in an item catalog or an item database (e.g., item database 311 (FIG. 3)) has at least one item type.

In some embodiments, block 521 further can correct a popularity bias of an item that occurs when the item is bought with other items often because the item is popular, not because it is complementary to all of the other items. Block 521 can correct such a popularity bias by an exemplary equation for a co-bought score, Score (A→B), for the likelihood that users who purchase item A would also purchase item B:

$$\text{Score}(A \rightarrow B) = \frac{\text{support}(A \cup B)}{\text{support}(A) * \text{support}(B)}$$

wherein:
  support(A) is the percentage of transactions that include item A;
  support(B) is the percentage of transactions that include item B; and
  support(A∪B) is the percentage of transactions that include items A and B.

Additionally, block 520 can include a block 522 of determining a respective rank for each of the one or more complementary items. The respective rank can be determined based at least in part on the respective score for each of the one or more complementary items. Block 522 further can include sorting the one or more complementary items based on the respective scores. Block 522 also can limit the quantity of the one or more complementary items by one or more of: (a) eliminating some of the one or more complementary items that are associated with respective scores lower than a predetermined threshold; or (b) keeping a predetermined number of complementary items with higher respective scores.

Further, block 520 can include a block 523 of re-ranking (e.g., personalizing) the one or more complementary items based on a respective likelihood score for each of the one or more complementary items based on a preference of the user who the recommendation is for. Block 523 can determine the preference of the user as a vector of a respective preference for each attribute of item/item-type attributes based on the user profile, including the transactions history (e.g., orders made), engagements history (e.g., adding to cart, inquiring, searching, clicking, etc.), user settings, and so forth. Examples of the item/item-type attributes can include: (1) type preferences for various items (e.g., shredded vs. whole, for cheese); (2) price sensitivity at an item level or an item-type level (e.g., price bracket at every item level or item-type level); (3) brand sensitivity and preferences; (4) restriction preferences (e.g., lactose-free, caffeine-free, etc.); (5) restricted foods preferences (e.g., no animal products or GMO-free); (6) dietary methods preferences (e.g., the Paleolithic diet, Atkins diet, or vegan); (7) dietary preferences (e.g., kosher diet or cholesterol-free); (8) allergens preferences (e.g., tree-nut, shellfish, etc.); (9) flavors preferences (e.g., chocolate or vanilla); (10) container types preferences (e.g., boxes or cones for ice-cream); and/or (11) quantity preferences (e.g., 12 oz., 24 oz., etc.); etc. The preference of the user for the item/item-type attributes can be determined on the fly by block 523 or constantly updated, and saved to the user profile at, for example, user profile database 312 (FIG. 3), by a server or a system with machine leaning capabilities, such as system 300 (FIG. 3), system 310 (FIG. 3), or system 400 (FIG. 7).

In some embodiment, block 523 can determine the respective likelihood score for each of the one or more complementary items by one or more approaches for determining conditional probabilities, such as Bayesian probability. For example, block 523 can adopt an equation:

$$\log L = \Sigma_i w_i \log P(A_i|PT) + w_{PT} \log P(PT)$$

wherein:
L is the likelihood of a user buying an item;
$A_i$ is the i-th attribute of the item/item-type attributes for the item;
PT is the item type for the item;
P(PT) is the preference of the user concerning the item type;
$P(A_i|PT)$ is the respective preference of the user for the i-th attribute from the user profile;
$W_i$ is weight for different attributes; and
$W_{PT}$ is the weight for the item type for the item.

In some embodiments, method 500 further can include a block 530 of re-ranking the complementary items by boosting an item of the one or more complementary items, when the item is either one of the favorite items of the user as found in the user profile or in a promotion by a retailer. Boosting the item of the one or more complementary items can include one of: making the item to be the first among the one or more complementary items to be recommended; moving the item up a predetermined number of places in the order of the one or more complementary items (e.g., moving from the $5^{th}$ place to the $3^{rd}$ place); increasing a ranking score for the item by a predetermined percentage before re-ranking (e.g., adding 10% of the ranking scores); etc.

In some embodiments, method 500 further can include a block 540 of determining a recommendation confidence for the recommendation, after the one or more complementary items, as ranked, are determined. Before or concurrently with determining the recommendation confidence, block 540 can track in real-time the state of a session. In many embodiments, a session can comprise one or more user interactions and can expire in a predetermined period of time (e.g., 10 minutes) or after a predetermined number of interactions (e.g., 30 clicks or 50 utterances). Example of tracking the state of the session can include determining the following state information, such as whether any of the one or more complementary items has been included in any prior recommendation within the same session, although the prior recommendation was not presented to the user; whether any of the one or more complementary items has been provided to the user in any prior recommendation within the same session; whether any of the one or more complementary items has been added to the cart; one or more feedbacks, negative or positive (e.g., adding to the cart or inquiring about the recommended item), from the user in the session; a likelihood for the user to accept a recommendation by adding at least one of the one or more complementary items to the cart; and so forth.

In some embodiments, upon determining that at least one item of the one or more complementary items has been provided in a prior declined recommendation within the same session or is already added to the cart, block 540 further can eliminate the at least one item from the one or more complementary items. In certain embodiments where method 500 is performed by a conversational recommending system (e.g., system 300 (FIG. 3), system 310 (FIG. 3), or system 400 (FIG. 3)), block 540 can determine an initial probability or score, P(u), of whether the user (u) will add an item to the cart based at least in part on historical transactional data and/or engagement data of the user, including the interactions of the user with other systems, such as a retail website. An exemplary formula for the initial recommendation add-to-cart (ATC) probability or score, P(u), can be:

$$P(u) = \frac{\text{\# of items } ATC}{\text{\# of items recommended}}$$

In similar or other embodiments, after block 540 makes at least one recommendation in the session, block 540 can update the recommendation ATC score by, for example:

$$P(u) = \frac{\text{\# of items } ATC + k_1}{\text{\# of items recommended} + k}$$

wherein:
k is the number of times the user accepts or rejects recommendations; and
$k_1$ is the number of times the user accepts a recommendation that results in ATC.

In a number of embodiments, block 540 further can update a state record for the user according to the state of the session, as tracked. The state record for the user can include one or more of the state information provided above. In many embodiments, the state record can be stored in at least one of: a memory storage unit (e.g., memory storage unit 208 (FIG. 2), a RAM, a cache, a flash memory, etc.), a hard drive (e.g., hard drive 114 (FIG. 1)), or a database (e.g., user profile database 312 (FIG. 3)), etc.

In many embodiments, block 540 can use entropy of the joint probability distribution, as tracked, of the one or more complementary items as a measure of recommendation confidence. The entropy of a probability distribution P(u, i, j) is high when a probability for a user (u) to add item (j) for anchor item (i) to the cart is uniformly distributed for all of the items in an item catalog or an item database (e.g., item database 311 (FIG. 3)). That is, high entropy indicates that the user does not appear to prefer with certainty any item of the one or more items, and thus the recommendation confidence is negative. In contrast, when the entropy of the distribution is low, there is less uncertainty, and thus the recommendation confidence is positive.

For a given user (u), anchor item (i), and complementary item (j), the joint probability distribution P(u, i, j) can be determined by:

$$P(u,i,j)=P(u)*P(i,j|u)=P(u)*P(i|u)*P(j|i,u)$$

In some embodiments, block 540 can use the following formula to determine entropy of distribution (Entropy) of the items in the item catalog or the item database:

$$\text{Entropy} = \sum_{p_i} -p_i \log(p_i)$$

In a number of embodiments, block 540 can adopt a revised formula for approximate entropy. An exemplary formula for an approximate entropy (Entropy') can use the true probabilities of the top-k items (e.g., a top 30 items with higher respective likelihood scores) and assuming a uniform distribution over the remaining items:

$$\sum_{j<k} -p(u, i, j)\log(p(u, i, j)) - \left(1 - \sum_{j<k} p(u, i, j)\right)\log\frac{\left(1 - \sum_{j<k} p(u, i, j)\right)}{(N-k)}$$

This approach can save time when the number of items in an item catalog or an item database (e.g., item database 311 (FIG. 3)) is enormous, such as 50,000 items, 90,000 items, or 200,000 items, and calculating entropy of a joint probability distribution for all of the items can become overly time consuming.

Accordingly, block 540 can determine a recommendation confidence for cross-sell recommendations based on whether the approximate entropy of the joint probability distribution of the items selected by block 520 is less than a predetermined entropy threshold (β), such as 2.0. When the entropy, as determined, is less than the entropy threshold (β), block 540 can determine that the recommendation confidence is positive. Otherwise, the recommendation confidence is negative.

$$\sum_{j<k} -p(u, i, j)\log(p(u, i, j)) - \left(1 - \sum_{j<k} p(u, i, j)\right)\log\frac{\left(1 - \sum_{j<k} p(u, i, j)\right)}{(N-k)} < \beta$$

In some embodiments, method 500 further can include a block 550 of transmitting the complementary items to be presented via the user device when the recommendation confidence is positive. That is, after determining that the recommendation confidence is positive, block 550 can transmit, through the network, the one or more complementary items to be presented to the user via the user device; and when the recommendation confidence is not positive, block 550 can refrain from transmitting the one or more complementary items to be the user. The timing for transmitting the recommendations to the user device may vary depending on the embodiments. In some embodiments, after determining that the recommendation confidence is positive, block 550 can transmit, in real-time through the network, the one or more complementary items to be presented to the user via the user device. In several embodiments, block 550 can transmit the one or more complementary items when the user is ready to check out. In a number of embodiments, block 550 can transmit the one or more complementary items when the session is about to expire, and before a new session begins.

Figure 6:
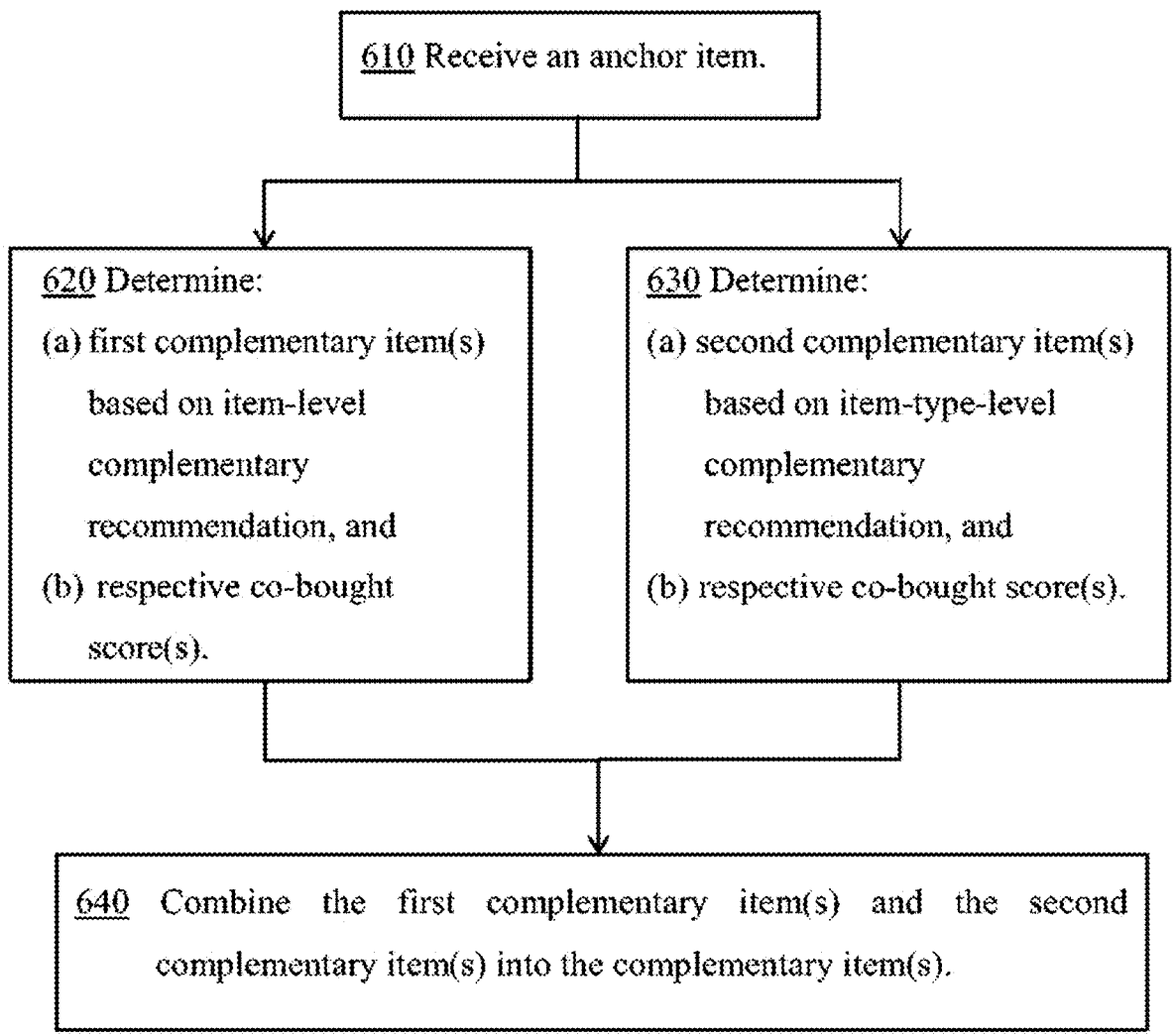
FIG. 6 illustrates a flow chart for a block of determining a recommendation for one or more complementary items, according to the embodiment of FIG. 5.

Turning ahead in the drawings, FIG. 6 illustrates a flow chart for block 521 of determining the one or more complementary items, according to the embodiment of FIG. 5. Block 521 is merely exemplary and is not limited to the embodiments presented herein. Block 521 can be employed in many different embodiments or examples not specifically depicted or described herein. In some embodiments, the procedures, the processes, and/or the activities of block 521 can be performed in the order presented. In other embodiments, the procedures, the processes, and/or the activities of block 521 can be performed in any suitable order. In still other embodiments, one or more of the procedures, the processes, and/or the activities of block 521 can be combined or skipped.

Referring to FIG. 6, block 521 can include a block 610 of receiving an anchor item, such as the anchor item received at block 510 (FIG. 5). Block 521 also can include a block 620 of determining: (a) one or more first complementary items based at least in part on item level complementary recommendation; and (b) a respective co-bought score for each of the one or more first complementary items. In some embodiment, block 620 can adopt one or more of the aforementioned approaches that are configured to determine a respective co-bought score between the anchor item and each of the one or more first complementary items at the item level, such as the revised skip-gram approach.

Block 521 further can include a block 630 of determining: (a) one or more second complementary items based on item-type-level complementary recommendation; and (b) a respective co-bought score for each of the one or more second complementary items. In a number of embodiments, block 630 can adopt one or more of the aforementioned approaches that are configured to determine a respective co-bought score for each of the one or more second complementary items at the item-type level. For example, the co-bought score at the item-type level (e.g., an item-type compatibility score) can be determined based at least in part on a probability that an item having an item type of the anchor item and another item with an item type of each of the one or more second complementary items are bought together by users in general. Block 620 and block 630 can be performed concurrently (e.g., FIG. 6) or sequentially in any order.

In some embodiments, block 521 also can include a block 640 of combining the one or more first complementary items and the one or more second complementary items into the one or more complementary items. In a number of embodiments, a respective score for each of the one or more complementary items is the co-bought score determined in block 620 and/or block 630. In some embodiments, block 640 can determine the respective co-bought score for each of the one or more complementary items based at least in part on whether the each of the one or more complementary items is found in block 620 and/or block 630. Block 640 further can correct a popularity bias of the respective co-bought score for each of the one or more complementary items based at least in part on the exemplary approach(s) provided above, for example.

Turning ahead in the drawings, FIG. 7 illustrates a flow chart for block 540 of determining a recommendation confidence for the recommendation, according to the embodiment of FIG. 5. Block 540 is merely exemplary and is not limited to the embodiments presented herein. Block 540 can be employed in many different embodiments or examples not specifically depicted or described herein. In some embodiments, the procedures, the processes, and/or the activities of block 540 can be performed in the order presented. In other embodiments, the procedures, the processes, and/or the activities of block 540 can be performed in any suitable order. In still other embodiments, one or more of the procedures, the processes, and/or the activities of block 540 can be combined or skipped.

Referring to FIG. 7, block 540 can include a block 710 of determining joint probability distributions for a respective co-bought likelihood or score for each the one or more complementary items as stated above. For example, block 710 can determine the joint probability distributions based at least in part on the user profile (e.g., historical transaction data and/or historic engagement date for the user) and/or one or more user feedbacks in the current session, as tracked. In some embodiments, block 710 can pre-process, before determining the joint probability distributions, the one or more complementary items by one or more of: eliminating one or more duplicate items that are already added to the cart or are to-be recommended again in this session, or limiting the size of the one or more complementary items, etc.

Block 540 further can include a block 720 of determining, after determining a respective co-bought score for each of the one or more complementary items and a corresponding joint probability distribution for the respective co-bought score, an approximate entropy of the joint probability distribution for the respective co-bought score for each of the one or more complementary items. In a number of embodiments, the approximate entropy can be determined as described above. Once the joint probability distribution for the respective co-bought score is determined, block 540 also can include a block 730 of determining a recommendation confidence for the recommendation based at least in part on whether the approximate entropy is less than a predetermined uncertainty threshold. In some embodiments, when the approximate entropy is less than the predetermined uncertainty threshold, the recommendation confidence is positive, while the recommendation confidence is negative when the approximate entropy is not less than the predetermined uncertainty threshold.

Figure 8:
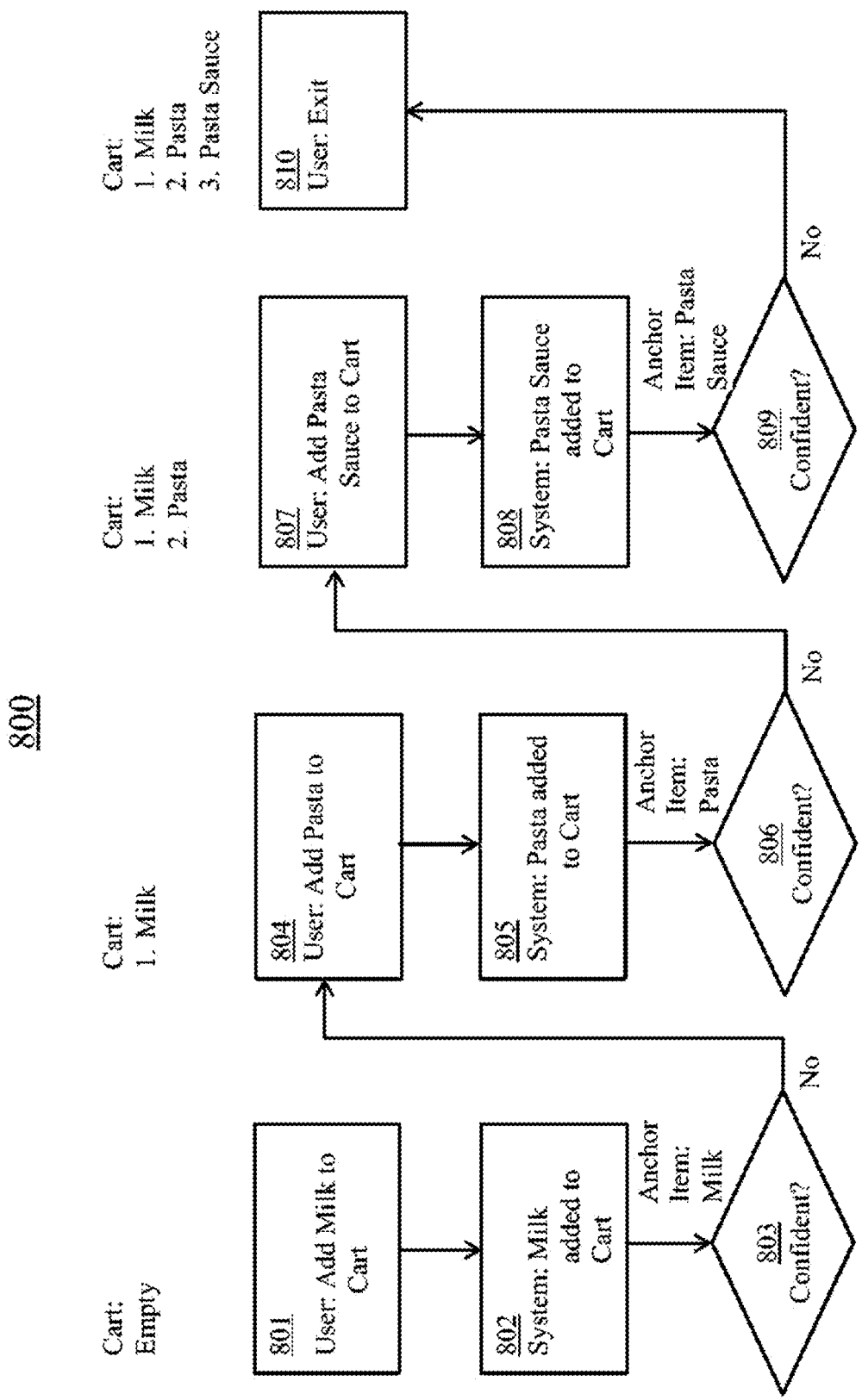
FIG. 8 illustrates an exemplary series of interactions between a user and a system, according to an embodiment.

Turning ahead in the drawings, FIG. 8 illustrates an exemplary series 800 of interactions between a user (User) and a system (System), according to an embodiment. Series 800 and System are merely exemplary and are not limited to the embodiments presented herein. Series 800 can happen in many different embodiments or examples not specifically depicted or described herein. In some embodiments, the interactions, the inputs, the outputs, and/or the activities of series 800 can occur in the order presented. In other embodiments, the procedures, the interactions, the inputs, the outputs, and/or the activities of series 800 can proceed in any suitable order. In still other embodiments, one or more of the interactions, the inputs, the outputs, and/or the activities of series 800 can be combined or skipped.

In many embodiments, System can be similar or identical to system 300 (FIG. 3), system 310 (FIG. 3), and/or system 400 (FIG. 4). In some embodiments, User can be similar or identical to user 330 (FIG. 3) and can interact with System via a user device (e.g., user device 320 (FIG. 3)) through a network (e.g., network 340 (FIG. 3)).

In some embodiments, series 800 can include a block 801 of User giving an add-to-cart command associated with an anchor item, Milk, in a session. The add-to-card command can be in any suitable form, such as a text, audio data (e.g., an utterance), or video data (e.g., hand gestures or eye movements), etc. The add-to-cart command can comprise information about the anchor item, such as the brand, the item type, the quantity, and/or the item name, etc. Series 800 also can include a block 802 of System adding the anchor item, Milk, to the cart. Block 802 can include automatically interpreting, by System, the add-to-cart command received from the user, via a user device through a network.

Series 800 further can include a block 803 of System determining whether to present a recommendation to User based on a recommendation confidence, after determining one or more items for the recommendation. Block 803 can be similar or identical to block 540 (FIG. 5). In the embodiment in FIG. 8 where (a) Milk is not associated with a high co-bought score for any other items, and (b) the user profile of User includes a low add-to-cart (ATC) probability (P(u)), block 803 can determine that the recommendation confidence is negative because every respective co-bought score for each of the one or more complementary items with Milk is low and also because P(u) is low. P(u) here can be similar or identical to P(u) of block 540 (FIG. 5) described above.

Series 800 additionally can include blocks 804 and/or 807 of User giving another add-to-cart command for a respective anchor item, such as Pasta in block 804, and/or Pasta Sauce in block 807, followed by blocks 805 or 808, respectively, of System adding the respective anchor item to the cart. Series 800 further can include blocks 806 and/or 809 of System determining whether to present a respective recommendation to User based on a respective recommendation confidence, after determining one or more items for the respective recommendation. In the embodiment in FIG. 8 where (a) the user profile of User includes a high user preference for seasoning, and (b) an item database (e.g., item database 311 (FIG. 3)) includes a high respective item-type-complementary compatibility score (e.g., a co-bought score at the item-type level) for seasoning with Pasta and/or Pasta Sauce, blocks 806 and/or 809 can determine that the respective recommendation confidence is negative because of the low P(u) for User. In the embodiment in FIG. 8, series 800 finally includes a block 810 of User exiting System, either by checking out or by terminating the session. With the decisions in blocks 803, 806, and 809 not to recommend, the cart of block 810, before User exits in block 810, comprise the items User adds to the cart, without additional recommended items, and P(u) remains the same as its initial value when the session starts.

Figure 9:
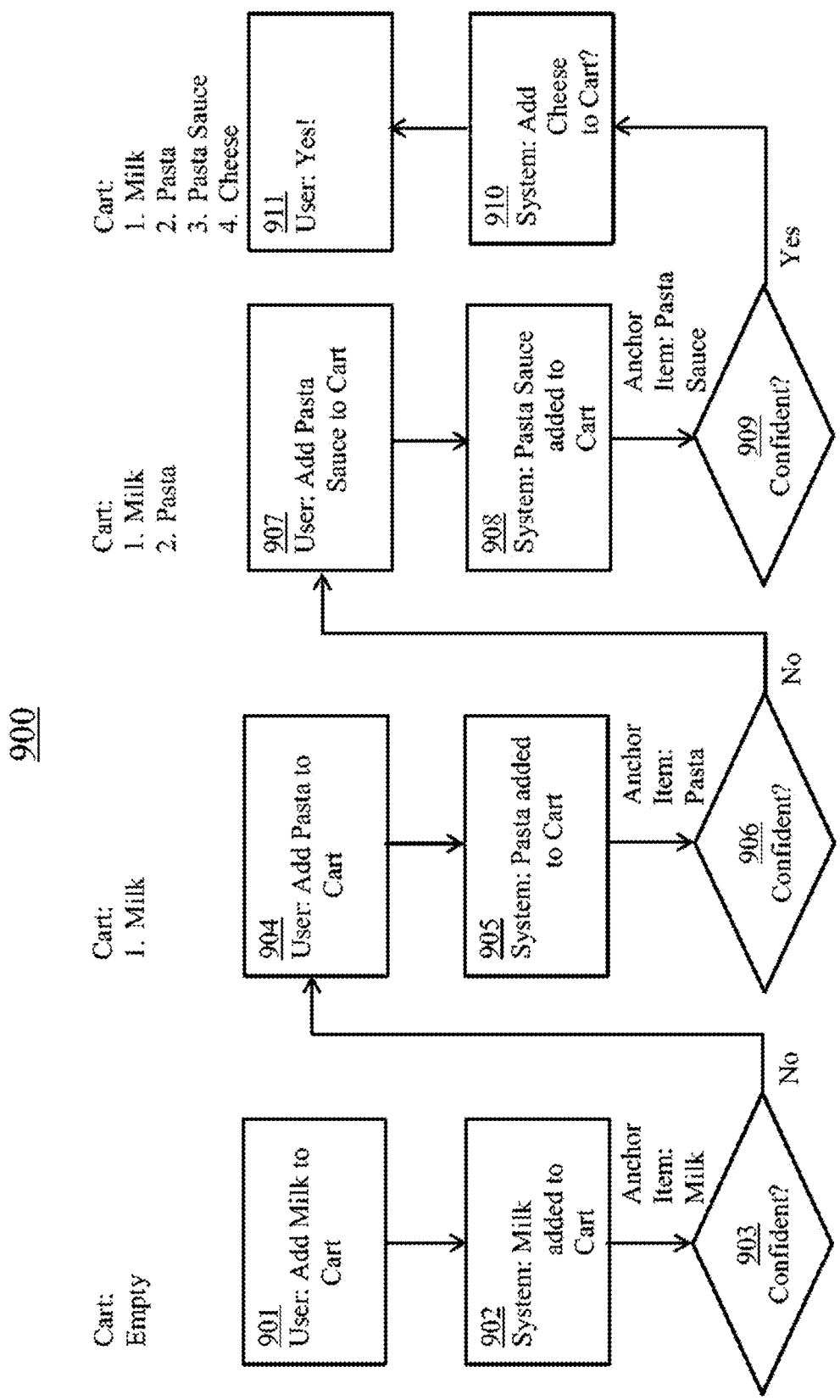
FIG. 9 illustrates an exemplary series of interactions between a user and a system, according to another embodiment.

Turning ahead in the drawings, FIG. 9 illustrates an exemplary series 900 of interactions between a user (User) and a system (System), according to another embodiment. Series 900 and System are merely exemplary and are not limited to the embodiments presented herein. Series 900 can happen in many different embodiments or examples not specifically depicted or described herein. In some embodiments, the interactions, the inputs, the outputs, and/or the activities of series 900 can occur in the order presented. In other embodiments, the procedures, the interactions, the inputs, the outputs, and/or the activities of series 900 can proceed in any suitable order. In still other embodiments, one or more of the interactions, the inputs, the outputs, and/or the activities of series 900 can be combined or skipped.

In many embodiments, System can be similar or identical to system 300 (FIG. 3), system 310 (FIG. 3), and/or system 400 (FIG. 4). In some embodiments, User can be similar or identical to user 330 (FIG. 3) and can interact with System via a user device (e.g., user device 320 (FIG. 3)) through a network (e.g., network 340 (FIG. 3)).

In some embodiments, series 900 can include a block 901 of User giving an add-to-cart command associated with an anchor item, Milk, in a session. Series 900 also can include a block 902 of System adding the anchor item, Milk, to the cart. Series 900 further can include a block 903 of System determining whether to present a recommendation to User based on a recommendation confidence, after determining one or more items for the recommendation. Block 903 can be similar or identical to block 540 (FIG. 5). In the embodiment in FIG. 9 where (a) Milk is not associated with a high co-bought score for any other items and (b) the User generally accepts recommendations (e.g., the user profile includes a high ATC probability (P(u))), block 903 can determine that the recommendation confidence is negative because although P(u) is high, every respective co-bought score for each of the one or more complementary items with Milk is low.

Series 900 additionally can include block 904 of User giving another add-to-cart command for anchor item, Pasta, followed by block 905 of System adding Pasta to the cart. Series 900 further can include block 906 of System determining whether to present a respective recommendation to User. In the embodiment in FIG. 9 where (a) P(u) is relatively high, (b) a co-bought score for a complementary item, Cheese, with Pasta at the item level is relatively high, and (c) the user profile of User includes a high user preference for Cheese, block 906 and/or 909 can determine that the respective recommendation confidence is negative because a predetermined entropy threshold (β) compared to the entropy of the joint probability distribution is still low.

Series 900 also can include block 907 of User giving a new add-to-cart command for a respective anchor item, Pasta Sauce, and a block 908 of System adding Pasta Sauce to the cart. Series 900 further can include block 909 of System determining that the respective recommendation confidence is positive because in the embodiment in FIG. 9, (a) P(u) is relatively high, (b) a co-bought score for a complementary item, Cheese, with Pasta, the previous anchor item is relatively high, (c) a co-bought score for Cheese with Pasta Sauce is relatively high, and (d) the user profile of User includes a high user preference for Cheese. In the embodiment in FIG. 9, series 900 further can include a block 910 of System recommending Cheese to User, via a user device through a network. Series 900 can include a block 911 of User accepting the recommendation, and as a result of the acceptance of the recommended complementary item, Cheese is added to the cart.

In many embodiments, the techniques described herein can provide a practical application and several technological improvements. In some embodiments, the techniques described herein can provide for automatically determining a recommendation confidence for recommending one or more complementary items from an item catalog for an anchor item. These techniques described herein can provide a significant improvement over conventional approaches of excessive recommendations that not only are ineffective and possibly annoying but also waste network data bandwidth.

In many embodiments, the techniques described herein can beneficially generate a generic co-bought score model at an item level and an item-type level, a personalization model, and a recommendation confidence model which can be used to present precise recommendations when the recommendations are likely effective. In many embodiments, the techniques described herein can be used in real-time at a scale that cannot be handled using manual techniques. For example, the number of unique items can be over tens or hundreds of thousands or even millions, and there can be hundreds or thousands of real-time, personalized recommendations to be provided to online users at any moment.

In a number of embodiments, the techniques described herein can solve a technical problem that arises only within the realm of computer networks, as online ordering do not exist outside the realm of computer networks. Moreover, the techniques described herein can solve a technical problem that cannot be solved outside the context of computer networks. Specifically, the techniques described herein cannot be used outside the context of computer networks, in view of a lack of data.

Various embodiments can include a system including one or more processors and one or more non-transitory computer-readable media storing computing instructions configured to run on the one more processors and perform certain acts. The acts can include receiving, via a user device of a user through a network, an add-to-cart command associated with an anchor item in a session by the user. The acts further can include determining, in real-time after receiving the add-to-cart command, a recommendation for one or more complementary items based at least in part on: (a) the anchor item; and (b) a user profile of the user. The acts also can include determining, in real-time after determining the recommendation, a recommendation confidence for the recommendation based at least in part on one or more of: (a) the user profile; (b) the anchor item; (c) the one or more complementary items; or (d) one or more feedbacks from the user associated with one or more prior recommendations in the session.

In some embodiments, the acts additionally can include after determining the recommendation confidence, when the recommendation confidence is positive, transmitting, in real-time through the network, the one or more complementary items to be presented to the user via the user device. In a number of embodiments, the acts also can include after determining the recommendation confidence, when the recommendation confidence is not positive, refraining from transmitting the one or more complementary items to the user.

A number of embodiments can include a method being implemented via execution of computing instructions configured to run at one or more processors and stored at one or more non-transitory computer-readable media. The method can include receiving, via a user device of a user through a network, an add-to-cart command associated with an anchor item in a session by the user. The method further can include determining, in real-time after receiving the add-to-cart command, a recommendation for one or more complementary items based at least in part on: (a) the anchor item; and (b) a user profile of the use. The method also can include determining, in real-time after determining the recommendation, a recommendation confidence for the recommendation based at least in part on one or more of: (a) the user profile; (b) the anchor item; (c) the one or more complementary items; or (d) one or more feedbacks from the user associated with one or more prior recommendations in the session. The method additionally can include after determining the recommendation confidence, when the recommendation confidence is positive, transmitting, in real-time through the network, the one or more complementary items to be presented to the user via the user device. The method also can include after determining the recommendation confidence, when the recommendation confidence is not positive, refraining from transmitting the one or more complementary items to the user.

Although the methods described above are with reference to the illustrated flowcharts, it will be appreciated that many other ways of performing the acts associated with the methods can be used. For example, the order of some operations may be changed, and some of the operations described may be optional, skipped or altered.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although determining a recommendation confidence for one or more complementary items before recommending has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-9 may be modified, and that the foregoing discussion of certain of these embodiments does not necessarily represent a complete description of all possible embodiments. For example, one or more of the procedures, processes, or activities of FIGS. 5-7 may include different procedures, processes, and/or activities and be performed by many different modules, in many different orders. As another example, one or more of the procedures, processes, and/or activities of one of FIGS. 5-7 can be performed in another one of FIGS. 5-7. As another example, the systems and/or subsystems within system 300 or system 310 in FIG. 3 or system 400 in FIG. 4 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions configured to run on the one or more processors and perform:
   receiving, via a user device of a user through a network, an add-to-cart command associated with an anchor item in a session by the user;
   determining, in real-time after receiving the add-to-cart command, a recommendation for one or more complementary items based at least in part on: (a) the anchor item; and (b) a user profile of the user;
   determining, in real-time after determining the recommendation, a recommendation confidence for the recommendation based at least in part on one or more of:
   the user profile;
   the anchor item;
   the one or more complementary items; or
   one or more feedbacks from the user associated with one or more prior recommendations in the session; and
   after determining the recommendation confidence, when the recommendation confidence is positive, transmitting, in real-time through the network, the one or more complementary items to be presented to the user via the user device; and
   after determining the recommendation confidence, when the recommendation confidence is not positive, refraining from transmitting the one or more complementary items to the user.

2. The system in claim 1, wherein the computing instructions are further configured to perform:
   prior to determining the recommendation confidence for the recommendation, removing a duplicate item of the one or more complementary items when at least one of:
   one or more prior declined recommendations comprise the duplicate item; or
   a cart for the user comprises the duplicate item.

3. The system in claim 1, wherein determining the recommendation confidence further comprises:
   determining an approximate entropy for one or more joint probability distributions, each respective joint probability distribution of the one or more joint probability distributions being associated with the user, the anchor item, and each of the one or more complementary items;

after determining the approximate entropy, when the approximate entropy is less than a predetermined uncertainty threshold, the recommendation confidence is positive; and after determining the approximate entropy, when the approximate entropy is not less than the predetermined uncertainty threshold, the recommendation confidence is negative.

4. The system in claim 3, wherein:

the user profile comprises a transactional history; and a respective joint probability distribution for the user, the anchor item, and each of the one or more complementary items is determined based at least in part on one or more of:

a recommendation add-to-cart score associated with one or more of: the transactional history of the user profile, the one or more prior recommendations, or the one or more feedbacks;

an add-to-cart score for the anchor item associated with the user; or a respective likelihood score for each of the one or more complementary items associated with the anchor item and the user.

5. The system in claim 4, wherein:

each of the one or more complementary items is associated with one or more respective attributes;

the user profile further comprises one or more user attribute preferences for one or more respective attributes associated with each of the one or more complementary items; and the respective likelihood score for each of the one or more complementary items is determined based at least in part on the one or more user attribute preferences.

6. The system in claim 1, wherein:

determining the recommendation further comprises:

determining each of the one or more complementary items based at least in part on one or more of:

one or more complementary item types for an item type of the anchor item;

a respective item-item complementarity score for the each of the one or more complementary items associated with the anchor item; or a respective user-item compatibility score for the each of the one or more complementary items associated with one or more system users, the one or more system users comprising the user.

7. The system in claim 6, wherein:

each of the one or more complementary items is associated with a respective co-bought score determined based at least in part on one of:

the respective item-item complementarity score;

the respective user-item compatibility score; or a respective item-type compatibility score; and determining the recommendation further comprises:

determining a respective rank for each of the one or more complementary items based on the respective co-bought score.

8. The system in claim 1, wherein:

determining the recommendation further comprises re-ranking the one or more complementary items based on a respective likelihood score for each of the one or more complementary items associated with the anchor item and the user.

9. The system in claim 1, wherein the computing instructions are further configured to perform:

prior to determining the recommendation confidence for the recommendation, re-ranking the one or more complementary items by boosting a boosted item of the one or more complementary items, when at least one of:

one or more favorites of the user profile comprises the boosted item; or one or more promotional items of a retailer comprises the boosted item.

10. The system in claim 1, wherein:

transmitting the one or more complementary items to be presented to the user via the user device is performed when one or more of:

at a check out by the user;

in real-time after determining the recommendation confidence for the recommendation; or at a session-change by the system.

11. A method being implemented via execution of computing instructions configured to run at one or more processors and stored at one or more non-transitory computer-readable media, the method comprising:

receiving, via a user device of a user through a network, an add-to-cart command associated with an anchor item in a session by the user;

determining, in real-time after receiving the add-to-cart command, a recommendation for one or more complementary items based at least in part on: (a) the anchor item; and (b) a user profile of the user;

determining, in real-time after determining the recommendation, a recommendation confidence for the recommendation based at least in part on one or more of:

the user profile;

the anchor item;

the one or more complementary items; or one or more feedbacks from the user associated with one or more prior recommendations in the session;

after determining the recommendation confidence, when the recommendation confidence is positive, transmitting, in real-time through the network, the one or more complementary items to be presented to the user via the user device; and after determining the recommendation confidence, when the recommendation confidence is not positive, refraining from transmitting the one or more complementary items to the user.

12. The method in claim 11 further comprising:

prior to determining the recommendation confidence for the recommendation, removing a duplicate item of the one or more complementary items when at least one of:

one or more prior declined recommendations comprise the duplicate item; or a cart for the user comprises the duplicate item.

13. The method in claim 11, wherein determining the recommendation confidence further comprises:

determining an approximate entropy for one or more joint probability distributions, each respective joint probability distribution of the one or more joint probability distributions being associated with the user, the anchor item, and each of the one or more complementary items;

after determining the approximate entropy, when the approximate entropy is less than a predetermined uncertainty threshold, the recommendation confidence is positive; and after determining the approximate entropy, when the approximate entropy is not less than the predetermined uncertainty threshold, the recommendation confidence is negative.

14. The method in claim 13, wherein:
the user profile comprises a transactional history; and
a respective joint probability distribution for the user, the anchor item, and each of the one or more complementary items is determined based at least in part on one or more of:
- a recommendation add-to-cart score associated with one or more of the transactional history of the user profile, the one or more prior recommendations, or the one or more feedbacks;
- an add-to-cart score for the anchor item associated with the user; or
- a respective likelihood score for each of the one or more complementary items associated with the anchor item and the user.

15. The method in claim 14, wherein:
each of the one or more complementary items is associated with one or more respective attributes;
the user profile further comprises one or more user attribute preferences for one or more respective attributes associated with each of the one or more complementary items; and
the respective likelihood score for each of the one or more complementary items is determined based at least in part on the one or more user attribute preferences.

16. The method in claim 11, wherein:
determining the recommendation further comprises:
determining each of the one or more complementary items based at least in part on one or more of:
- one or more complementary item types for an item type of the anchor item;
- a respective item-item complementarity score for the each of the one or more complementary items associated with the anchor item; or
- a respective user-item compatibility score for the each of the one or more complementary items associated with one or more system users, the one or more system users comprising the user.

17. The method in claim 16, wherein:
each of the one or more complementary items is associated with a respective co-bought score determined by one of:
- the respective item-item complementarity score;
- the respective user-item compatibility score; or
- a respective item-type compatibility score; and determining the recommendation further comprises:
determining a respective rank for each of the one or more complementary items based on the respective co-bought score.

18. The method in claim 11, wherein:
determining the recommendation further comprises re-ranking the one or more complementary items based on a respective likelihood score for each of the one or more complementary items associated with the anchor item and the user.

19. The method in claim 11 further comprising:
prior to determining the recommendation confidence for the recommendation, re-ranking the one or more complementary items by boosting a boosted item of the one or more complementary items, when at least one of:
- one or more favorites of the user profile comprises the boosted item; or
- one or more promotional items of a retailer comprises the boosted item.

20. The method in claim 11, wherein:
transmitting the one or more complementary items to be presented to the user via the user device is performed when one or more of:
- at a check out by the user;
- in real-time after determining the recommendation confidence for the recommendation; or
- at a session-change.

* * * * *